United States Patent [19]

Bricker

[11] 4,313,585

[45] Feb. 2, 1982

[54] ROLLING SUPPORT PLATFORM DEVICE FOR WRITING, DRAWING AND THE LIKE

[76] Inventor: Bernard L. Bricker, 14932 Northridge, Huntington Beach, Calif. 92649

[21] Appl. No.: 62,545

[22] Filed: Jul. 31, 1979

[51] Int. Cl.$^3$ .......... F16M 11/26

[52] U.S. Cl. .......... 248/118.5; 401/48

[58] Field of Search .......... 248/118.5; 401/48, 28, 401/212; 33/41 D, 41 F; 35/36, 37

[56] References Cited

U.S. PATENT DOCUMENTS

| | | | |
|---|---|---|---|
| 555,763 | 3/1896 | Fessenden | 401/212 |
| 576,596 | 2/1897 | Marsh | 401/212 |
| 926,427 | 6/1909 | Lacy | 248/118.5 |
| 988,893 | 4/1911 | Packewitz | 248/118.5 |
| 1,510,877 | 10/1924 | Wiedenmann | 248/118.5 |
| 1,627,635 | 5/1927 | Craig | 248/118.5 |
| 1,848,605 | 3/1932 | Conway | 401/48 |
| 3,051,980 | 9/1962 | Rosenthal | 401/48 |

FOREIGN PATENT DOCUMENTS

| | | | |
|---|---|---|---|
| 76124 | 4/1919 | Austria | 401/48 |
| 17348 | 7/1907 | Norway | 35/37 |

*Primary Examiner*—William H. Schultz
*Attorney, Agent, or Firm*—Willie Krawitz

[57] ABSTRACT

A rolling support platform device is provided to assist in drawing, marking, writing, etc. The platform device also may be used as a teaching aid and by the handicapped, etc.

The device includes a metal or plastic platform having three or more socket-shaped, partial knock-outs and a ball bearing in each socket.

Sufficient friction is imparted to a bearing by each socket, thereby producing a smooth rolling action without the problems of over rolling.

3 Claims, 6 Drawing Figures

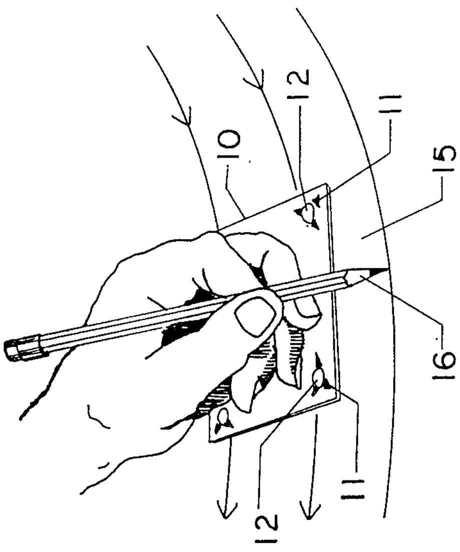
FIG. 1
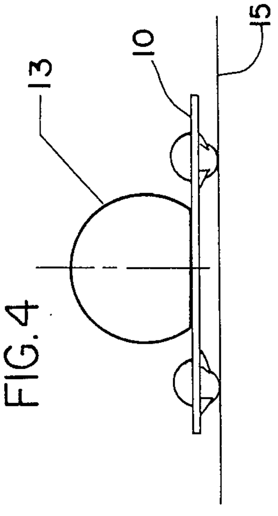
FIG. 4
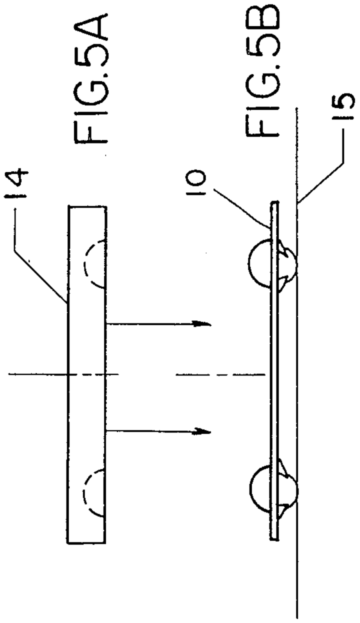
FIG. 5A
FIG. 5B
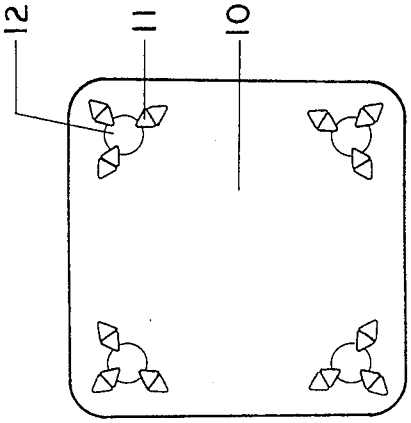
FIG. 2
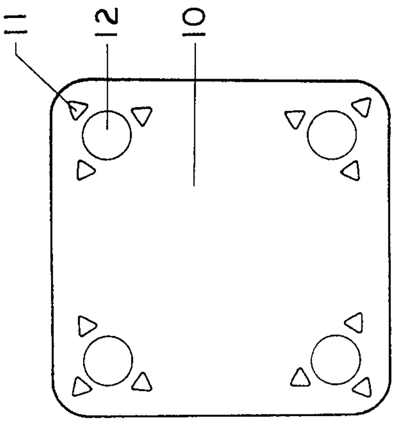
FIG. 3

ROLLING SUPPORT PLATFORM DEVICE FOR WRITING, DRAWING AND THE LIKE

BACKGROUND OF THE INVENTION

This invention relates to a rolling platform device for assisting in writing, drawing, etc., and which may also be utilized by handicapped persons, as a teaching aid, and so forth.

Many devices have, in the past, been employed as a writing support, and these can be divided into two types. The first type of support includes a friction contact member that carries a pen, and which requires the user to move against the force of friction in order to produce a mark on a writing sheet. The second type of support employs a roller bearing device which reduces the friction between the user and a writing sheet.

Two typical patents of the roller bearing support device are described in U.S. Pat. Nos. 757,383 and 1,627,635. The former patent discloses a device having a single ball bearing in a grip type platform, and the latter patent describes a bearing race mounted in the platform. The writing support employing a bearing race is expensive and unnecessarily heavy. Also, due to its low friction properties, it manipulates too readily and hence, the user does not have complete control over the device. Finally, if erasures are made on the writing sheet or paper, erasure particles will eventually be picked up by the bearings and will ultimately jam the race. In the case of a writing platform employing a single bearing, the friction load is simply too great to enable ease of manipulation.

A writing device is required that is inexpensive and which enables the user to easily clean or replace a jammed bearing. Also, the device should provide the proper writing friction and should enable the user to write or draw effectively on an uneven surface.

THE INVENTION

According to the invention, a rolling platform device is provided including a base platform, a plurality of cleats, preferably three to five, disposed peripherally on the platform, each cleat mounting a ball bearing, whereby a smooth rolling action is obtained while supporting a user's hand, thereby enabling a continuous and controlled writing action.

The rolling platform device of this invention is not only light and inexpensive, but erasure particles may be easily cleaned from the bearings and the cleat crevices. If a bearing becomes worn or damaged, it can be removed readily and replaced.

BRIEF DESCRIPTION OF THE DRAWINGS

FIG. 1 shows, in perspective, a rolling platform support in use for a writer, according to the invention;

FIGS. 2 and 3 are bottom and plan views, respectively of the rolling support platform device of this invention;

FIG. 4 is a cross section view in side elevation showing the rolling support platform and handle affixed thereto; and, FIGS. 5A, 5B are exploded views in side elevation of the support platform and an inking pad for the bearings.

BRIEF DESCRIPTION OF THE PREFERRED EMBODIMENTS

FIG. 1 shows the rolling platform 10 of this invention for supporting a writer's hand, the platform being perforated by a plurality of cleats 11 into which are inserted ball bearings 12. As shown in FIG. 4, a handle 13 manufactured from foam, etc. is mounted (e.g. by an adhesive) on the upper side of the platform for ease of handling.

FIGS. 5A, 5B illustrate another embodiment of the invention which utilizes a foam or sponge pad 14 adapted to be mounted on the platform and in contact with the cleats 11 and/or bearings 12. When the pad 14 is impregnated with ink, colorant, etc., it will contact the cleats and be transferred to the bearings when the platform is moved. This, in turn, will cause the bearings to form a series of marks on a paper 15 or substrate similar to those produced by a marking device 16 itself. These markings enable the user or a teacher of writing, art, etc. to diagnose poor writing habits and hand movements and suggest corrections. As an example, markings caused by the bearings will reflect wrist motions, while markings caused by a pen will be partly due to finger motion. Hence, these differences which reflect wrist and finger articulation, will be reflected by the difference between the markings of the bearings and pen; if poor penmanship, etc. is a problem, these differences can be diagnosed and remedied or minimized. After use, the pad and support are simply cleaned.

When in use, because the bearings are disposed in a cleat rather than a bearing race, friction on the bearings is increased; however, this enables the user to exert a much better control over the device.

It will be appreciated that various modifications of the invention may be utilized while still retaining the essential elements thereof. As an example, the bearings need not be disposed evenly around the platform periphery, but may be configured to provide most of the bearings rearwardly of the platform, and the fewest number of bearings near the leading edge.

I claim:

1. A device for aiding in writing, and the like, including:

a. a single element platform for supporting a writer's hand while manipulating a writing instrument;

b. at least three partial knock-out cleats fabricated integrally from and disposed peripherally of the platform;

c. a ball bearing rotatably disposed in each cleat, an upper bearing surface being exposed in each cleat for cleaning thereof and a lower bearing surface for contact with a writing surface;

d. frictional contact between a cleat and bearing being sufficient to slow the rolling action of the platform when in use, thereby aiding in control of the device by the writer;

e. the cleats being adapted for insertion and removal of bearings therefrom; and, f. a handle mounted on the device for directing and lifting the platform when use.

2. The device of claim 1 providing an absorbant pad in contact with the cleats or bearings and containing an ink, colorant or the like to thereby transfer ink to the bearings and the writing surface, whereby differences between writing marks produced by the roller bearings and a writer's pen, reflecting differences in articulation between finger and wrist movements can be diagnosed for remedial purposes.

3. The device of claim 1 or 2 including from three to five bearings disposed peripherally of the platform.

* * * * *